United States Patent
Ostromek et al.

(10) Patent No.: US 6,747,821 B2
(45) Date of Patent: Jun. 8, 2004

(54) METHOD AND SYSTEM FOR MOUNTING A DETECTOR

(75) Inventors: Timothy E. Ostromek, Richardson, TX (US); Timothy B. Hogan, Irving, TX (US); Jeffrey C. Short, Plano, TX (US); Antonio V. Bacarella, Dallas, TX (US); Jerry D. Porter, Dallas, TX (US); Allan B. Lewis, Nevada, TX (US); Rodney L. Doster, Garland, TX (US); Robert F. Lund, Plano, TX (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 10/250,120

(22) Filed: Jun. 4, 2003

(65) Prior Publication Data

US 2003/0231410 A1 Dec. 18, 2003

Related U.S. Application Data

(60) Provisional application No. 60/319,306, filed on Jun. 12, 2002.

(51) Int. Cl.$^7$ ................................................ G02B 7/02
(52) U.S. Cl. ................................................ 359/822
(58) Field of Search ........................ 359/819, 822, 359/694, 829, 703

(56) References Cited

U.S. PATENT DOCUMENTS

| | | |
|---|---|---|
| 4,463,252 A | 7/1984 | Brennan et al. ...... 250/214 VT |
| 4,602,861 A | 7/1986 | Taniguchi et al. ............ 396/81 |
| 4,679,068 A | 7/1987 | Lillquist et al. ............... 348/33 |
| 4,751,571 A | 6/1988 | Lillquist ...................... 348/164 |
| 5,035,472 A | 7/1991 | Hansen ....................... 359/350 |
| 5,557,451 A | 9/1996 | Copenhaver et al. ........ 359/350 |
| H001599 H | 10/1996 | Task et al. ..................... 348/33 |
| 5,729,010 A | 3/1998 | Pinkus et al. .......... 250/214 VT |
| 5,729,376 A | 3/1998 | Hall et al. ................... 359/366 |
| 5,910,816 A | 6/1999 | Fontenot et al. ............... 348/65 |
| 6,560,029 B1 | 5/2003 | Dobbie et al. .............. 359/630 |
| 2003/0066951 A1 | 4/2003 | Benz et al. ........... 250/214 VT |
| 2003/0193397 A1 * | 10/2003 | Ikeda .......................... 340/555 |

* cited by examiner

Primary Examiner—Ricky Mack
(74) Attorney, Agent, or Firm—Marsteller & Associates, P.C.

(57) ABSTRACT

A system (S) for mounting and aligning a detector (D) about an observation instrument (10) includes a first detector (12) movably coupled to the observation instrument (10) off an axis of observation centerline (14) for the observation instrument (10). A retainer (16) is mounted with the observation instrument (10) to secure the first detector (12) to the observation instrument (10). The retainer (16) permits rotatable movement of the first detector (12) about the axis of observation centerline (14). The retainer (16) also preferably includes an attachment point (20) for mounting the first detector (12) to the retainer (16). The first detector (12) should be adjustable at least about an axis (22) essentially perpendicular to the axis of the observation centerline (14) for the observation instrument (10).

8 Claims, 2 Drawing Sheets

METHOD AND SYSTEM FOR MOUNTING A DETECTOR

CROSS REFERENCE TO RELATED APPLICATIONS

This application claims the benefit of U.S. Provisional Application Serial No. 60/319,306, filed Jun. 12, 2002, entitled METHOD AND SYSTEM FOR MOUNTING A DETECTOR.

BACKGROUND OF INVENTION

1. Technical Field

This invention relates generally to the field of imaging systems and more specifically to a method and system for aligning a detector mounted on an observation instrument.

2. Background Art

Multiple sensor imaging systems generate an image of an object by fusing data that is collected using multiple sensors. Gathering image data using multiple sensors, however, has posed challenges. In some systems, the sensors detect light received from separate apertures. Data generated from light from separate apertures, however, describe different points of view of an object that need to be reconciled in order to fuse the data into a single image. Additionally, using separate apertures for different sensors may increase the bulk of an imaging system.

In other systems, light from an aperture is split into components before entering the sensors. Reflective and refractive elements are typically used to direct the light to different sensors. For example, the system described in U.S. Pat. No. 5,729,376 to Hall et al. includes multiple reflective and refractive elements such as a lens that reflects light towards one sensor and refracts light towards another sensor. Each individual sensor, however, detects only a component of light, for example, only specific wavelengths of light, and thus cannot generate image data from the full spectrum. Additionally, multiple reflective and refractive elements may add to the bulk and weight of an imaging system. Consequently, gathering image data from multiple sensors has posed challenges for the design of imaging systems.

Certain systems require timing of energy pulses be shared. For example, a laser beam may be initiated and the time that the light takes to be reflected is used to calculate distance to the point causing the reflection. In such an instance, detecting the time that the laser beam is initiated is critical.

While the above cited references introduce and disclose a number of noteworthy advances and technological improvements within the art, none completely fulfills the specific objectives achieved by this invention.

SUMMARY OF INVENTION

While known approaches have provided improvements over prior approaches, the challenges in the field of imaging systems have continued to increase with demands for more and better techniques having greater effectiveness. Therefore, a need has arisen for new methods and systems for movably mounting a detector to an observation instrument.

In accordance with the present invention, a system for mounting and aligning a detector about an observation instrument includes a first detector movably coupled to the observation instrument off an axis of observation centerline for the observation instrument. A retainer is mounted with the observation instrument to secure the first detector to the observation instrument. The retainer permits rotatable movement of the first detector about the axis of observation centerline. The retainer also preferably includes an attachment point for mounting the first detector to the retainer. The first detector should be adjustable at least about an axis essentially perpendicular to the axis of the observation centerline for the observation instrument.

Embodiments of the invention may provide numerous technical advantages. A technical advantage of one embodiment is that the detector can be rotated to a position such that a detected plane is in a common plane with a projected beam emanating from a source adjacent the observation instrument.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

Figure 1:
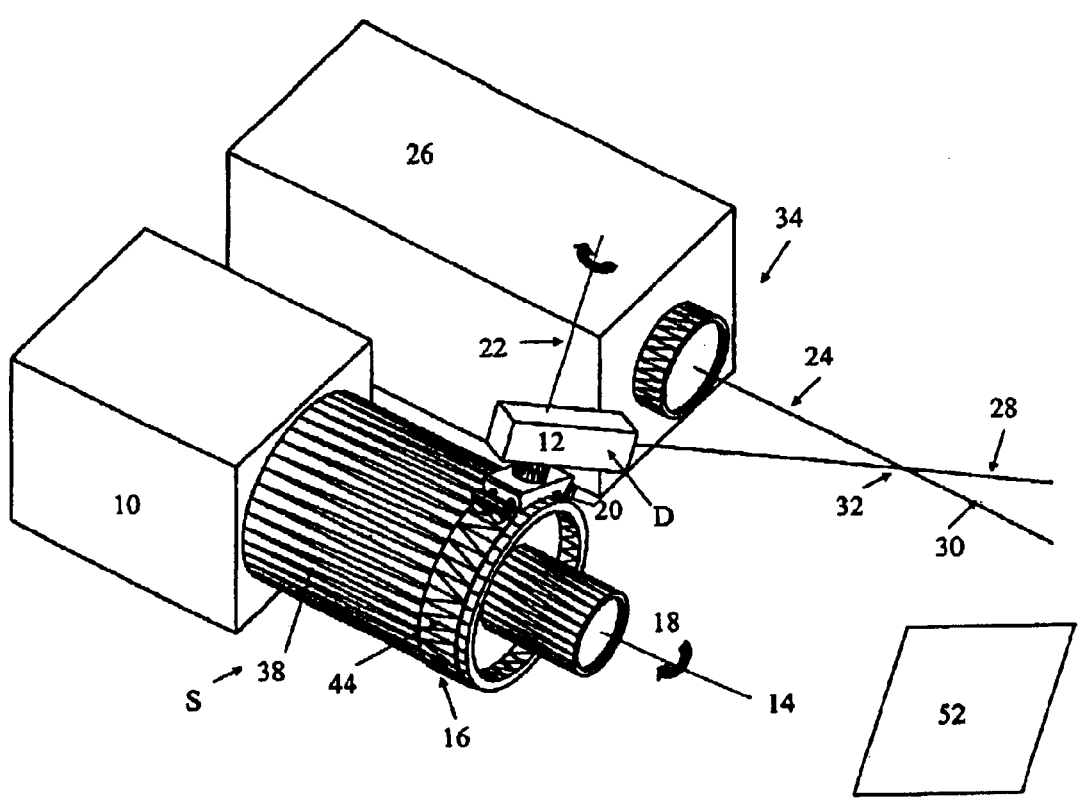
FIG. 1 illustrates one embodiment of a system for mounting a detector to an observation instrument.
Figure 1B:
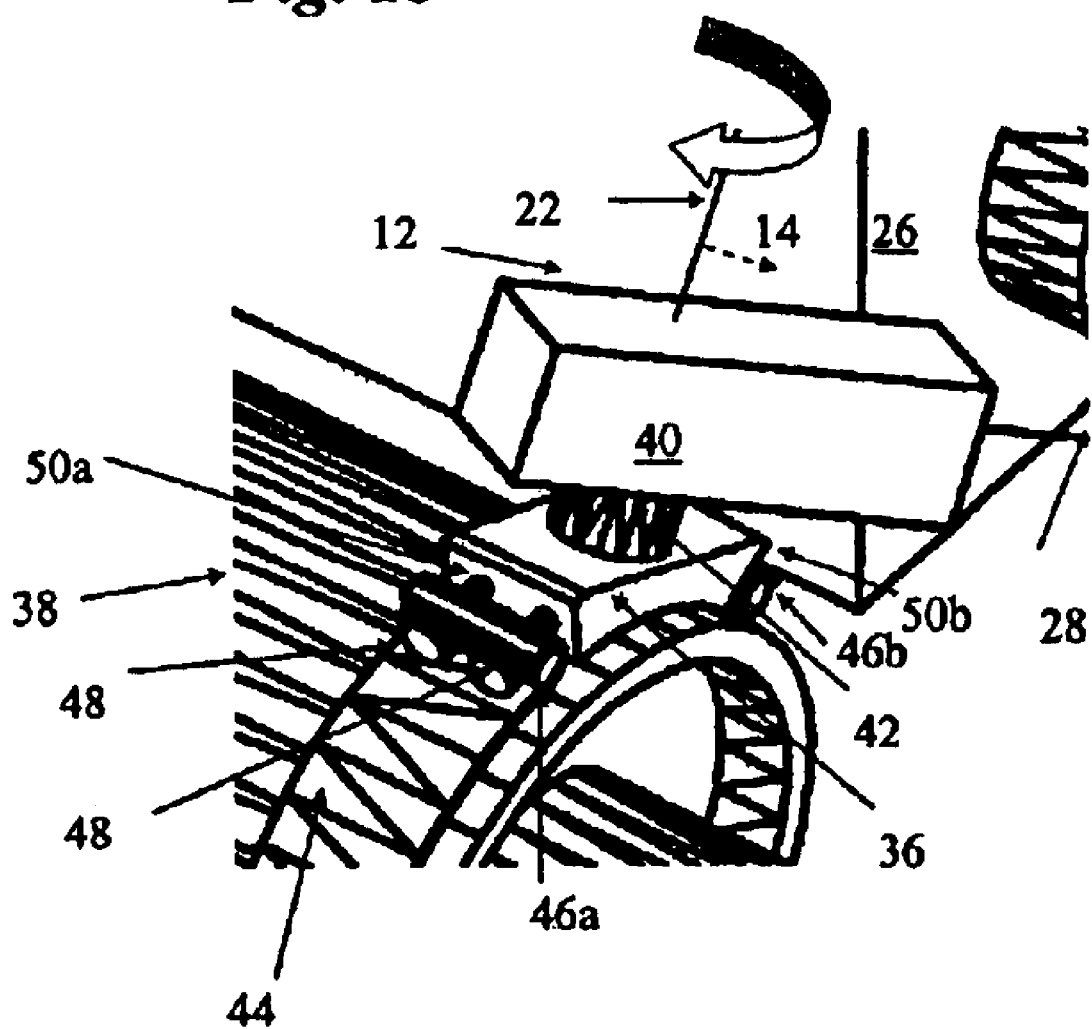
FIG. 1b is an enlargement of the retainer and mounting block of FIG. 1.

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

A system S for mounting and aligning a detector D about an observation instrument 10 includes a first detector 12 movably coupled to the observation instrument 10 off an axis of observation centerline 14 for the observation instrument 10. A retainer 16 is mounted with the observation instrument 10 to secure the first detector 12 to the observation instrument 10. The retainer 16 permits rotatable movement 18 of the first detector 12 about the axis of observation centerline 14. The retainer 16 also preferably includes an attachment point 20 for mounting the first detector 12 to the retainer 16. The first detector 12 should be adjustable at least about an axis 22 essentially perpendicular to the axis 14 of the observation centerline for the observation instrument 10.

The present invention relates to aligning a detector D that is mounted on an observation instrument 10 to observe the beginning or presence of a laser beam 24 that is adjacent to the observation instrument 10. The observation instrument 10 with mounted detector 12 should be placed beside the laser 26 that generates the laser beam 24 to be observed. The centerlines 28 and 30, respectively, of the detector path and laser beam must intersect 32 at some point in front 34 of the origination of the laser beam 24. The positions of the two instruments, those being the laser 26 and detector 12, optionally may be changed at each deployment.

The observation instrument 10 may be a known type of night vision goggle or viewer, or an infrared camera.

A base 36 is mounted to or attached about the objective housing 38 of the observation instrument 10 in a manner that allows the base 36 to be rotated 180 degrees, or as desired, around an observation optical centerline 14. Preferably, the base 36 can be locked at any angle. On the rotatable base 36, the detector housing 40 is mounted on a pivot 42 that will allow the detector housing 40 to pivot or rotate about a centerline 22 that is perpendicular to the observation centerline 14.

Optionally, a strap or band 44 of a selected size and composition is preferably placed around the objective lens cell 38. A base or block 36 is placed against the cell 38 between the ends 46a, 46b of the strap 44. Two screws 48 from each end 46a, 46b of the strap 44 are threaded into two opposing sides 50a, 50b of the base 36. Loosening the strap-base screws 48 allows the strap-base assembly to rotate around the centerline 14 of the objective lens. A short pivot column 42 rises from the middle of the base 36 onto which the detector housing 40 can be attached or pivoted. The detector housing 40 is retained and locked by means of screws (not shown). Loosening the pivot screws allows the detector 12 to be rotated on an axis 22 perpendicular to the objective centerline 14.

ALTERNATIVE EMBODIMENTS: The detector D may alternatively be mounted on a ball and swiveled into alignment with the beam then locked in place with set screws. Also, the detector D may be mounted on a lockable gimbal. Either of these alternative embodiments could limit some of the necessary angles that the detector might be required to turn.

By mounting the detector as disclosed above, the detector base 36 can be rotated to a position so that a detected plane 52 is in a common plane with the projected beam 30. After coplanar alignment, the detector D can be pivoted to intersect the projected beam 30 at any desired point 32.

The foregoing disclosure and description of the invention are illustrative and explanatory thereof, and various changes in the size, shape and materials, as well as in the details of the illustrated construction may be made without departing from the spirit of the invention.

What is claimed is:

1. A system for mounting and aligning a detector about an observation instrument, the system comprising:
   a first detector movably coupled to the observation instrument off an axis of observation centerline for the observation instrument;
   a retaining means with the observation instrument for securing the first detector and rotatable movement about the axis of observation centerline, the retainer including an attachment means for mounting the first detector to the retainer; and,
   the first detector being adjustable at least about an axis essentially perpendicular to the axis of the observation centerline for the observation instrument.

2. The invention of claim 1 wherein the retainer includes a strap circumferentially mounted about an objective lens housing of the observation instrument.

3. The invention of claim 2 wherein the first detector is pivotally secured by the circumferential strap.

4. The invention of claim 1 wherein the observation instrument is a night vision goggle.

5. A method of mounting and aligning a detector about an observation instrument with an adjacent laser generating a laser beam, comprising:
   movably coupling a first detector to the observation instrument off an axis of observation centerline for the observation instrument;
   securing the first detector with a retainer to the observation instrument to permit rotatable movement of the detector about the axis of observation centerline, the retainer including an attachment means for mounting the first detector to the retainer; and,
   adjusting the first detector at least about an axis essentially perpendicular to the axis of the observation centerline for the observation instrument.

6. The method of claim 5 wherein the retainer includes a strap circumferentially mounted about an objective lens housing of the observation instrument.

7. The method of claim 6 wherein the first detector is pivotally secured by the circumferential strap.

8. The method of claim 5 wherein the observation instrument is a night vision goggle.

\* \* \* \* \*